Nov. 22, 1927.
W. J. GAGNON
1,650,506
COUPLING
Filed June 25, 1927
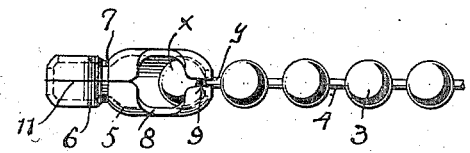
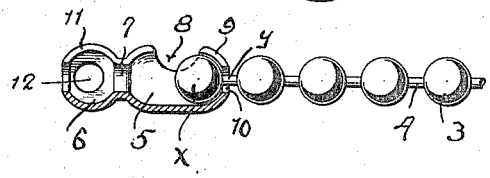
Inventor:
WILLIAM J. GAGNON
By his Attorneys Patented Nov. 22, 1927.

1,650,506

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING.

Application filed June 25, 1927. Serial No. 201,543.

My invention relates to a coupling, and particularly to a coupling adapted to connect a bead chain to a jump ring or the like. The object of my invention is to provide an economical and efficient swivel coupling.

In the accompanying drawings—

Fig. 1 is a plan view of a bead chain with an attached coupling embodying my invention; and Fig. 2 is a side elevation thereof, the coupling being shown in section.

My invention is particularly directed to couplings for use with chains composed of hollow beads or balls 3 interconnected by dumbbell links 4. The coupling is made from sheet metal formed into tubular shape and affording a pair of chambers 5 and 6 spaced by a tubular neck 7. The blank is cut away at its opposite side margins to afford, in the finished product, a lateral aperture 8 which opens into the chamber 5 and is of sufficient size to admit the end ball $x$ of the chain to the chamber; and also a narrow slot 9 leading from the aperture 8 to an end aperture 10 of sufficient size to accommodate the link $y$ connected to the end ball $x$. The slot 9 is preferably of slightly less width than the diameter of the link, so that the link must be forced therethrough. The inherent resilience of the metal of the coupling closes the slot 9 to its normal spacing, in which it impedes the escape of the link $y$ from the aperture 10.

The chamber 6 is preferably flattened on opposite sides, parallel to the plane of the seam 11 formed by the meeting edges of the blank. These sides are apertured at 12 to accommodate a split jump ring or the like.

A coupling of this construction is readily formed from sheet metal and affords a swivel connection with a chain, but a readily detachable connection so that the coupling may be disengaged from the chain without breaking the engagement between the coupling and an associated jump ring or the like.

I claim as my invention—

1. A coupling device for bead chains comprising a longitudinally seamed tubular member having a lateral opening on the seam to receive the end ball of a chain, and a slot extending in the plane of the seam from said aperture to an axial opening at one end of the chamber to accommodate a chain link connected to the ball, said tubular member at the opposite end thereof being apertured in register on an axis normal to the plane of said longitudinal seam to accommodate the ends of a split jump ring or the like.

2. A coupling device for bead chains comprising a longitudinally seamed tubular member having a lateral opening on the seam to receive the end ball of a chain, and a slot extending in the plane of the seam from said aperture to an axial opening at one end of the chamber to accommodate a chain link connected to the ball, the opposite end of said tubular member having its sides flattened in planes parallel to the plane of the seam, and said sides being apertured in register.

3. A coupling device comprising a longitudinally seamed tube offset at both ends and at a point intermediate said ends to form a pair of chambers and intervening constricted neck, one of said chambers having a lateral aperture in line with the tube seam, and a constricted passageway leading therefrom to one end of the chamber, said end being axially apertured, the other chamber of the coupling having flattened sides on opposite sides of the seam, and said sides being apertured in register, substantially as described.

In testimony whereof I have signed my name to this specification.

WILLIAM J. GAGNON.